United States Patent

Hausmann

[15] 3,654,569
[45] Apr. 4, 1972

[54] AERODYNAMIC WINDOW

[72] Inventor: George F. Hausmann, Glastonbury, Conn.

[73] Assignee: United Aircraft Corporation, East Hartford, Conn.

[22] Filed: Dec. 23, 1968

[21] Appl. No.: 786,485

[52] U.S. Cl............................................331/94.5, 350/319
[51] Int. Cl.........................................H01s 3/05, H01s 3/08
[58] Field of Search....................350/319; 330/4.3; 331/945, 331/94.5

[56] References Cited

OTHER PUBLICATIONS

Hurle et al., Electronic Population Inversion by Fluid-Mechanical Techniques, 8 Physics of Fluids 1601–07 (1966).

*Primary Examiner*—Benjamin A. Borchelt
*Assistant Examiner*—N. Moskowitz
*Attorney*—Jack N. McCarthy

[57] ABSTRACT

A gas dynamic laser emits an output beam from a low pressure region downstream of a nozzle section through which gases are expanded which contain the constituents necessary to obtain a lasing action. A gas dynamic laser employs the principles of kinetic relaxation of excited states of specific gas species to effect a population inversion of the excited states to obtain lasing action. An oscillator directs a low beam into said low pressure lasing region, and through an optic arrangement the beam is amplified and directed out of an opening in the gas dynamic laser. Under normal circumstances the provision of such an opening would incur a flow of air from the ambient pressure to the low pressure within the laser cavity. The opening is connected to an aerodynamic window. The window has an unobstructed passage leading from the low pressure region of the gas dynamic laser to its exterior in which pressures are set up permitting passage of the laser beam, yet preventing or minimizing the low of exterior air into the cavity. The pressures are set up by an intersecting passageway having a pump supplying high pressure fluid and a nozzle construction which provides the proper predetermined pressures.

10 Claims, 3 Drawing Figures

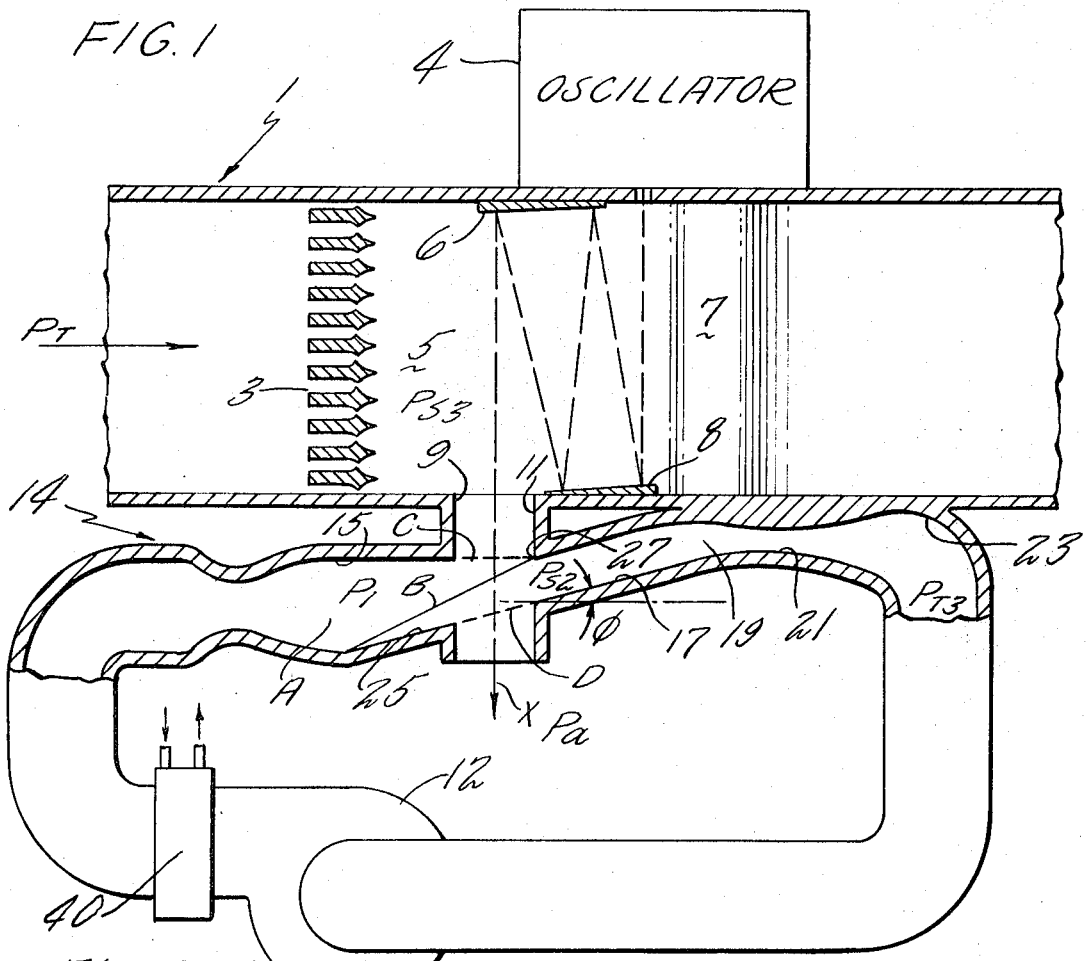
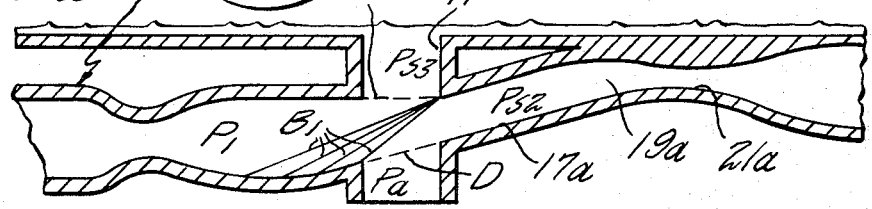
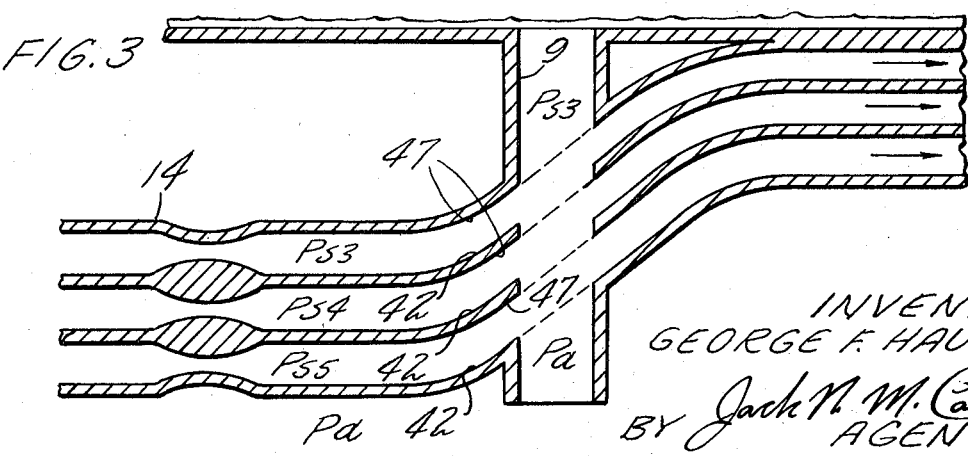
INVENTOR
GEORGE F. HAUSMANN
BY Jack N. M. Carthy
AGENT

AERODYNAMIC WINDOW

CROSS-REFERENCES TO RELATED APPLICATIONS

Application Ser. No. 731,658, filed May 23, 1968 is for an aerodynamic window having a different arrangement for providing the proper predetermined pressures.

BACKGROUND OF THE INVENTION

This invention relates to aerodynamic windows and particularly for gas dynamic lasers. In lasers of low power, windows with physical walls made of materials which transmit the laser wavelength have been used, but subject window is for use when the laser beam will disintegrate physical window materials.

SUMMARY OF THE INVENTION

A primary object of this invention is to provide a window which would permit passage of a laser beam with no physical obstructions, yet prevent or minimize flow through said window between the two areas of varying pressures.

In accordance with the present invention, flow is compressed to provide an oblique shock wave to prevent the flow of a fluid through a passageway.

Further, a closed-loop system can be used to reduce the pressure requirements of a pump.

BRIEF DESCRIPTION OF THE DRAWINGS

FIG. 1 is a view showing the use of a laser beam with an aerodynamic window in accordance with the present invention.

FIG. 2 is a view showing another modification of the compression surface which provides a series of weaker compression waves.

FIG. 3 is a view showing a plurality of windows between the interior of the cavity and the exterior thereof.

DESCRIPTION OF THE PREFERRED EMBODIMENT

A gas dynamic laser 1 comprises a nozzle 3, a laser cavity 5 and a diffuser 7. The laser beam formed in the cavity 5 is directed through an opening 9 in the side of the laser cavity. An oscillator 4 directs a laser beam into said laser cavity 5 and the beam is amplified between the mirror 6 and 8 to produce the output beam X. A passage 11 extends away from and around the opening 9 through which the output beam passes from the cavity.

A pump 12 supplies high pressure air, or other gas, to a Laval nozzle 14 which provides a uniform supersonic flow in a duct 15. Duct 15 intersects the passage 11 for directing the flow of said nozzle thereacross. A duct 17 intersects said passage 11 at a point directly across from the intersection of the duct 15 to receive the flow therefrom. The duct 17 extends into a diffusing section 19, nozzle throat 21 and an expansion section 23 where it is then connected to the inlet of the pump 12.

At point A the Mach number is supersonic and the static pressure $P_1$ is adjusted by the pump total pressure and the area ratio of the Laval nozzle 14 to be exactly equal to the static pressure $P_{s3}$ in the laser cavity. A wedge, or isentropic, surface 25 is provided to establish an oblique shock wave, or series of shock waves B, which causes an increase in the static pressure of the flow and the turning of the flow to the angle $\phi$. The configuration of the compression surface 25 is designed such that the static pressure downstream of the shock wave or waves $P_{s2}$, is exactly equal to the atmospheric pressure $P_a$. It is, thus, apparent that with $P_{s3}$ equal to $P_1$ there is no flow across streamline C, and since $P_{s2}$ is equal to $P_a$ that there is no flow across streamline D.

A laser beam can be passed through this opening and there will be a minimum of flow in the atmosphere into the laser cavity 5. The positioning of the aerodynamic window is such that the intercept of shock wave B is downstream of corner 27. The flow having a supersonic Mach number in duct 17 may be exhausted directly to the atmosphere at a low supersonic Mach number. However, an optimization of pump pressure requirements may be obtained by diffusing the flow at 19 which converts the kinetic energy of the flow to a static pressure which will be above the ambient value $P_a$. This flow is then ducted to the inlet of pump 12 at a pressure $P_{t3}$ which is higher than atmospheric pressure $P_a$, and therefore provides a reduction in pump pressure ratio to establish the desired operating characteristics.

Conventional compressible flow calculations indicate that a pressure ratio of 10:1 between the atmosphere and the laser cavity may be sustained for a Mach number, $M_1$, equal to 3.5 with a wedge compression angle of 35°. Assuming a total pressure recovery of 90 between the flow in duct 17 and the inlet to the pump 12, a pump pressure ratio on the order of 3:1 or 4:1 will provide the desired static pressure ratio between the atmosphere and the laser cavity. Under normal conditions the pump may be operated at constant RPM to effect the desired performance with no further control requirements. However, for sustained operation of the aerodynamic window, a heat exchanger 40 or other heat rejection device would be required to dissipate the adiabatic temperature rise of the pump.

A modified version of the aerodynamic window is shown in FIG. 2. In this case, the compression surface 25a downstream of nozzle 14 is designed to be curved to provide a series of weak compression waves $B_1$ which intercept at a point which is downstream of corner 27. The total pressure drop across this series of weak compression waves is less than that across the single oblique shock formed by the wedge 25 in FIG. 1, and thereby reduces the pump pressure requirement. The flow in duct 17a is either exhausted to the atmosphere or is compressed through a supersonic diffuser 19a and a subsonic diffuser 21a prior to recirculation to the pump.

FIG. 3 shows a modification wherein a plurality of windows are used between the interior of the cavity and the exterior thereof. This type of arrangement is useful when the differential between $P_{s3}$ and $P_a$ is very great or when pump pressure and flow requirements must be minimized. The pressures and duct geometry within each individual window are adjusted to provide a gradual pressure rise across the total window system.

The window in this modification is different than shown in FIG. 1 and FIG. 2 and involves a configuration in which both compression waves formed at compression surface 42 are used in conjunction with expansion waves formed at expansion surface 47 to provide a greater static pressure ratio across the aerodynamic window than could be obtained only by the use of a compression surface.

It is to be understood that the invention is not limited to the specific description above or specific figures shown, but may be used in other ways without departure from its spirit as defined by the following claims.

I claim:

1. In combination, a gas laser comprising a main duct, means providing a gas containing constituents necessary to obtain a lasing action, expansion means in said duct, a lasing region of low pressure downstream of said expansion means, reflector means in said main duct forming a laser output beam, an outlet in said main duct forming an exit for the reflected output laser beam, an outlet duct connected to said main duct and extending away therefrom around said outlet in said main duct, an auxiliary duct connected to said outlet duct and extending transversely thereacross, means providing supersonic flow through said auxiliary duct to form by compression waves a predetermined pressure difference across said exit duct, said auxiliary duct being formed at one part on one side of said outlet duct as a Laval nozzle with its open exhaust end being connected to the outlet duct by a short duct section having one side extending in a direction parallel to the center line of the Laval nozzle while the opposite side is formed having an angle with respect to the center line of the Laval nozzle, said auxiliary duct being formed on the other side of said outlet duct as a passage extending at an angle to said outlet duct which is a continuation of the angle set forth above.

2. A device for providing an aerodynamic window between two regions at different pressures including in combination, a passageway having an inlet and an outlet, said inlet being connected to one region and said outlet being connected to another region, a first transverse opening in said passageway, a Laval nozzle, conduit means connecting the exit of said nozzle to said first transverse opening, a compression wave forming surface on one wall of said conduit means upstream of said first transverse opening, a second transverse opening being positioned in said passageway across from the first transverse opening, a collection duct extending away from said second transverse opening, a pump connected to the inlet of said nozzle, a shock wave created by flow over said compression wave forming surface extends through the first transverse opening and intersects the opposite edge of the second transverse opening.

3. A device as set forth in claim 2, wherein the compression wave forming surface is a wedge.

4. A device as set forth in claim 2, wherein the compression wave forming surface is a curved surface.

5. A device as set forth in claim 2, wherein the wall opposite the compression wave forming surface is formed as an expansion wave forming surface.

6. A device as set forth in claim 5, wherein the compression wave forming surface and expansion wave forming surface extend from the exit of said nozzle at a substantially constant spacing to the first transverse opening in the passageway.

7. A device as set forth in claim 2, wherein the collection duct extends at an angle away from the passageway.

8. A device as set forth in claim 7, wherein said angle is approximately that of the wedge surface.

9. A device as set forth in claim 2, wherein a subsonic diffuser is located downstream of said collection duct, said diffuser having an inlet and outlet, said collection duct being connected to the inlet of said diffuser.

10. A device as set forth in claim 9, wherein the exit of the subsonic diffuser is connected to the inlet of the pump, pressure ratio across shock wave and absolute pressure on vacuum side adjusted by pump pressure, nozzle area ratio, and angle of compression wave forming surface.

* * * * *